United States Patent
Beno et al.

(10) Patent No.: US 11,132,238 B2
(45) Date of Patent: Sep. 28, 2021

(54) ELASTIC PACKAGING OF APPLICATION CONFIGURATION

(71) Applicant: BMC Software, Inc., Houston, TX (US)

(72) Inventors: Tal Beno, Thornhill (CA); Jonathan Newcomb Swirsky Whitney, Oakland, CA (US)

(73) Assignee: BMC Software, Inc., Houston, TX (US)

( * ) Notice: Subject to any disclaimer, the term of this patent is extended or adjusted under 35 U.S.C. 154(b) by 1382 days.

(21) Appl. No.: 13/631,189

(22) Filed: Sep. 28, 2012

(65) Prior Publication Data
US 2014/0095676 A1   Apr. 3, 2014

(51) Int. Cl.
| G06F 9/50 | (2006.01) |
| G06F 8/60 | (2018.01) |
| G06F 9/455 | (2018.01) |
| G06F 8/61 | (2018.01) |
| G06F 11/34 | (2006.01) |

(52) U.S. Cl.
CPC .............. *G06F 9/5077* (2013.01); *G06F 8/60* (2013.01); *G06F 8/61* (2013.01); *G06F 8/63* (2013.01); *G06F 9/45558* (2013.01); *G06F 11/3442* (2013.01); *G06F 2009/45562* (2013.01)

(58) Field of Classification Search
CPC .. G06F 15/177; G06F 9/5077; G06F 9/45558; G06F 8/60; G06F 8/61; G06F 8/63; G06F 11/3442; G05B 23/0216
USPC ....................................................... 709/220
See application file for complete search history.

(56) References Cited

U.S. PATENT DOCUMENTS

| 8,595,103 | B1 * | 11/2013 | Wargin | G06Q 10/06 705/35 |
| 2003/0009253 | A1 * | 1/2003 | McIntyre et al. | 700/108 |
| 2005/0288899 | A1 * | 12/2005 | Winstead | G01R 31/2837 702/183 |
| 2010/0132439 | A1 * | 6/2010 | Giles | G01N 29/032 73/64.53 |
| 2011/0213875 | A1 * | 9/2011 | Ferris | G06F 11/3442 709/224 |
| 2012/0047239 | A1 | 2/2012 | Donahue et al. | |
| 2012/0084607 | A1 * | 4/2012 | Lam | G06F 11/368 714/38.1 |
| 2012/0102486 | A1 | 4/2012 | Yendluri | |

(Continued)

OTHER PUBLICATIONS

Liu, Fang et al., "NIST Cloud Computing Reference Architecture", Recommendations of the National Institute of Standards and Technology, NIST Special Publication 500-292, (Sep. 2011), 35 pages.

*Primary Examiner* — David R Lazaro
*Assistant Examiner* — Xiang Yu
(74) *Attorney, Agent, or Firm* — Brake Hughes Bellermann LLP

(57) ABSTRACT

Elastic packaging of application configuration may include selecting at least one configurable attribute from an application model hierarchy, generating at least one formula for the selected at least one configurable attribute, the at least one formula including interface parameters, and tag the generated at least one formula with the selected at least one configurable attribute in an application deployment package, the application deployment package including an application to be deployed on a cloud computer.

18 Claims, 5 Drawing Sheets

(56) References Cited

U.S. PATENT DOCUMENTS

| | | | |
|---|---|---|---|
| 2012/0131181 A1* | 5/2012 | Birkler | H04L 43/08 709/224 |
| 2012/0167081 A1* | 6/2012 | Sedayao | G06F 11/3495 718/1 |
| 2013/0036208 A1* | 2/2013 | Dochez | G06F 9/5077 709/220 |
| 2013/0232463 A1* | 9/2013 | Nagaraja | G06F 8/61 717/101 |
| 2014/0082612 A1* | 3/2014 | Breitgand | G06F 9/5005 718/1 |

* cited by examiner

ELASTIC PACKAGING OF APPLICATION CONFIGURATION

BACKGROUND

1. Field

Embodiments relate to configuring resource attributes in cloud computing application packages.

2. Related Art

The information technology (IT) industries are transitioning away from standalone computing infrastructures (e.g., personal computers (PC)), to large scale infrastructures offering solutions that overlap and extend the offerings of the PC.

Cloud computing restructure the way that users engage with their information. With cloud computing, instead of installing and maintaining applications on every device in order to interact with data that may be spread across one or more of those devices, data is encapsulated in applications that are hosted as services on servers and delivered from those servers to the devices as clients. Typically, cloud computing services in the "public cloud" are hosted on the Internet, managed and maintained by third-party providers.

In cloud environments the cloud management server/service is responsible to provision the full application stack. Consisting of multiple layers from network and OS and up to the middleware and the application itself. Automation tools leverage software package for provisioning.

The term elasticity applies to the cloud in the sense that unlike traditional environments where a server/host has a constant amount of resources (e.g. memory, cpu, disk, network interfaces, etc.), in the cloud virtual machines (VMs) receive their resources from virtual resource pools. Thus a virtual host may "shrink" or "expand" per it's given resources.

Typically, application package content authors needed to write application oriented elastic content without guidance, process or tools. Cloud management tools usually govern the questions of when to deploy or redeploy (e.g. based on SLAs and contracts), where to deploy and what resources to allocate. Furthermore, the known solutions would perhaps provide the user with the opportunity to write elastic application configuration content, offering as input runtime variables of the environment (e.g. CPU, memory, disk, etc.). But at that point the users would need to figure out on their own questions such as: Which application configuration is resource sensitive? What should be configured/reconfigured due to change (in resources and environment)? What are the proper settings per the environment and available resources? Unfortunately this usually requires the author to have extensive domain expertise, and the lack of guided process or tools usually reflects on a lengthy development cycle.

SUMMARY

One embodiment includes a computer. The computer includes a memory having code segments that when executed by a processor cause the processor to select at least one configurable attribute from an application model hierarchy, generate at least one formula for the selected at least one configurable attribute, the at least one formula including interface parameters, and tag the generated at least one formula with the selected at least one configurable attribute in an application deployment package, the application deployment package including an application to be deployed on a cloud computer.

Another embodiment includes a cloud computing device. The cloud computing device includes a memory having code segments that when executed by a processor cause the processor to determine if an application is being installed for the first time or resources associated with a virtual machine have changed, and apply a configuration to the application if the application is being installed for the first time or the resources associated with a virtual machine have changed, the configuration being based on a formula and run-time variable associated with the virtual machine.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
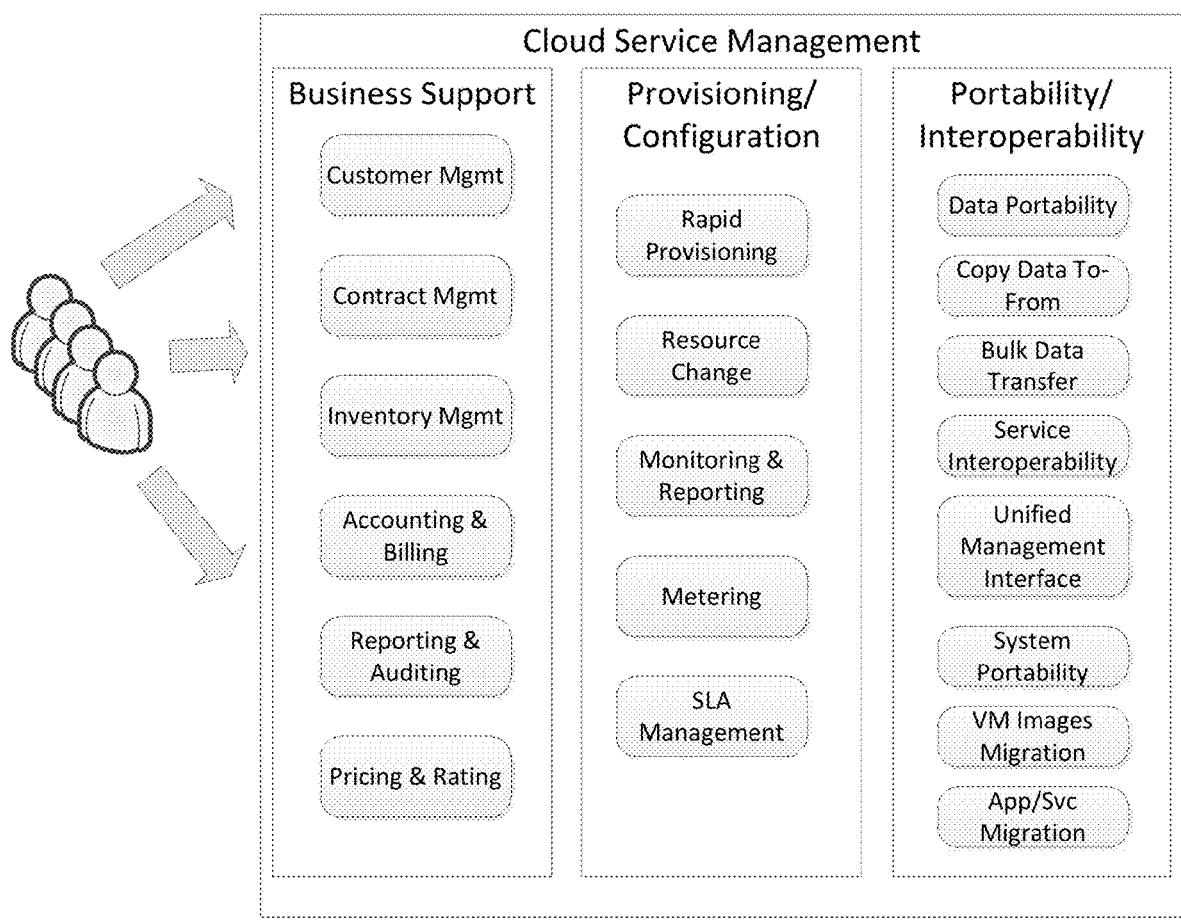
FIG. 1 illustrates roles of a conventional cloud service management system.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 illustrates roles of a conventional cloud service management system. Cloud Service Management 100 includes all of the service-related functions that are necessary for the management and operation of those services required by or proposed to cloud consumers. As shown in FIG. 1, cloud service management may be described from the perspective of business support, provisioning and configuration, and from the perspective of portability and interoperability requirements.

Business Support may include the set of business-related services dealing with clients and supporting processes. Business Support may include the components used to run business operations that are client-facing. Provisioning and Configuration may include, for example, deploying cloud systems based on the requested service/resources/capabilities and adjusting configuration/resource assignment for repairs, upgrades and joining new nodes into the cloud. Portability and Interoperability may include, for example, moving their data or applications across multiple cloud environments at low cost and minimal disruption and capability to communicate between or among multiple clouds.

In the cloud a typical goal is no operations (NoOps). NoOps is the concept that an IT environment may become so automated and abstracted from the underlying infrastructure that there is no need for a dedicated team to manage software. The goal of completely automating the deployment, monitoring, and management of applications and the infrastructure on which they run.

Figure 2:
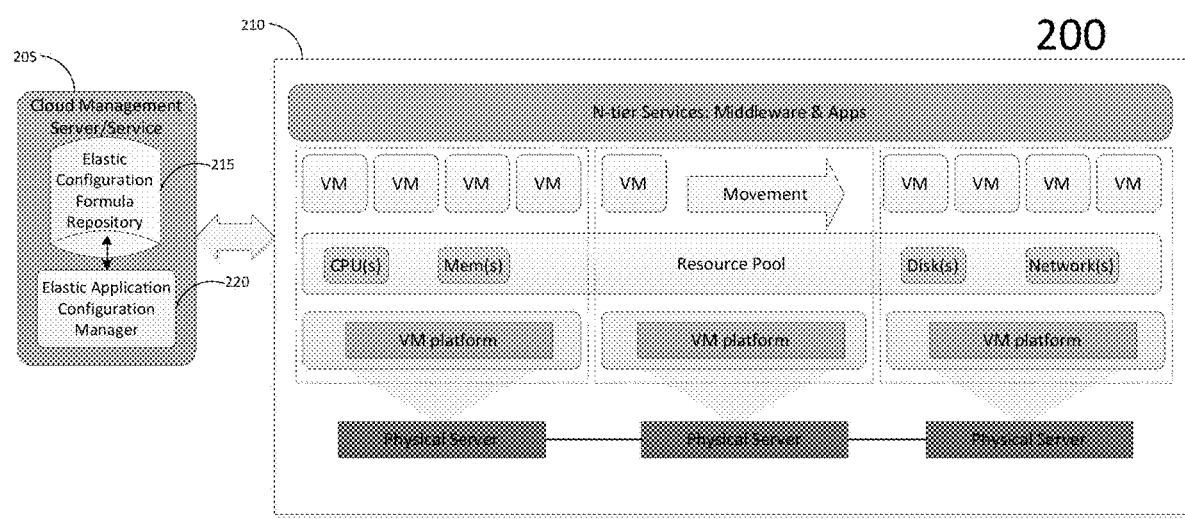
FIG. 2 illustrates an n-tier distribution in a cloud environment with a cloud management service/server according to an example embodiment.

FIG. 2 illustrates an n-tier distribution in a cloud environment with a cloud management service/server 200 according to an example embodiment. As is shown in FIG. 2, the n-tier distribution in a cloud environment with a cloud management service/server 200 includes a cloud management server/service 205 and a cloud environment 210.

The cloud management server/service 205 may be a central or distributed management server(s) configured to govern the cloud environment. The cloud management server/service 205 may include some or all of the functionality described above with regard to FIG. 1. Further, according to example embodiments the cloud management server/service 205 includes an elastic configuration formula repository 215 and an elastic application configuration manager 220. The elastic configuration formula repository 215 may be a database (or some other computer storage device) configured to store configuration formulas associated with an application.

The elastic application configuration manager 220 may include a special purpose processor and a computer readable medium configured to store code segments to perform the methods described below when executed by the special purpose processor. Alternatively, the cloud management server/service 205 may include an associated processor and memory such that the methods described below are executed by the cloud management server/service 205.

The cloud environment 210 may provide the flexible hardware (e.g., CPUs, memory, servers and the like) and software (e.g., middleware, applications, virtual machines (VM) and the like) configured to provide applications and services to a client.

VMs may get their resources from virtual pools. Thus dynamic allocation may be enabled through resource management for virtual machines (e.g., allocate processor and memory resources to virtual machines running on the same physical servers). Establish minimum, maximum, and proportional resource shares for CPU, memory, disk and network bandwidth. Modify allocations while virtual machines are running. Enable applications to dynamically acquire more resources to accommodate peak performance. Continuously monitors utilization across resource pools and intelligently allocates available resources among virtual machines based on predefined rules that reflect business needs and changing priorities. The result is a self-managing, highly optimized and efficient IT environment with built-in load balancing.

Services/applications may be deployed in the cloud on VMs. Enterprise applications may have an N-tier architecture and will rely on standard N-tier middleware types (e.g. web, app, db, msg-bus, etc.). While the middleware may benefit or be affected by a change in the hosting VM resources, the embedded application may need to undergo configuration changes in order to comply with these changes (e.g. adding connection pools to the DB).

Therefore, in addition to the automation of resource allocation as described above, in order to truly leverage these resources on the application level, additional work needs to be done in order to configure/re-configure the middleware and the application content accordingly. The challenge which we address is therefore: "what is the proper application configuration per the current VM resources?"

In the following sections we will elaborate on two specific constructs which will offer platform and process to achieve the above challenge. The Elastic configuration formula repository and the elastic application configuration manager.

Figure 3:
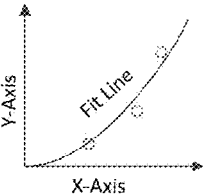
FIG. 3 illustrates an elastic application configuration authoring user-interface according to an example embodiment.

FIG. 3 illustrates an application attribute configuration user interface. As shown in FIG. 3, the application attribute configuration user interface may include several sub-windows. Although four sub-windows are shown, one skilled in the art will appreciate example embodiments are not limited thereto. The sub-windows may include an application model class hierarchy sub-window, an attribute sub-window, a formula interface sub-window, and a formula implementation sub-window. The application attribute configuration user interface may be executed on a client computer (e.g., a developer or configuration author computer).

According to example embodiments application deployment package content developers may set application configuration attributes (such as an application server thread pool size) in an elastic manner. For example, the application stack models could be hierarchic, branching from a software server entity to different types of application tiers such as application server, web servers, databases and message bus. The application stack models could branch further to different types of providers and products such as Weblogic, Websphere or Jboss in the case of application servers. Furthermore, each provider may branch according to versions. Each node/entity in the model inherits the list of attributes from the nodes parent and may override or extend the model.

According to example embodiments, there is a set of run-time (and design-time) variables which the automation framework offers to the application deployment package content developers when developing packages and to the package itself at execution-time. Such variables may include the resources that are available to the package in run-time (e.g., memory, disk, CPU, network, and the like).

According to example embodiments, a repository is present on the cloud management server (central or distributed) with the purpose of storing elastic formulas (interfaces and implementations) per the application model hierarchy and attributes. We refer to it as the elastic configuration formula repository.

According to example embodiments, methods are described to store and leverage formulas which set a configuration attribute in the application model hierarchy according to a sub-set of run-time variables. Formulas have an interface and an implementation. For example, the generic application server node or alternatively the Jboss model node may describe a ThreadPoolSize attribute for which we may add a formula interface which is based on the run-time variable "memory". The formula may for example include a linear function as its implementation which adds a value of 5 for every given GB of memory.

Both formula interfaces and implementations may be created in the context of a specific application content package or independently. Application deployment package content developers may associate a formula to any configuration attribute in any level of the application stack model. All formulas may be stored in an open repository. An attribute may have more than one formula interface, and each interface may have more than one implementation. An administrator user role may also tag one formula implementation as default for any specific configuration attribute in the model.

When creating an interface the application deployment package content developers may pick the relevant run-time variables which would take part in the formula, from a predefined list.

When authoring a formula implementation (for a specific formula interface/model attribute) the application deployment package content developers may choose to copy and change existing implementations from the repository, code the formula from scratch (leveraging any programming or scripting language) or, alternatively, leverage graphical tools to help the application deployment package content developers develop the formula automatically.

Such graphical tools may in example include a curve fitting or regression analysis software program (e.g. similar to MATLAB, MATHMATICA or Microsoft Excel). The output of the graphical tool may be automatically entered into the formula interface as the formula for the selected attribute for the selected resource.

The application deployment package content developers may be able to collect known values based on observed application behavior (trending, monitoring and testing of performance at certain configurations), push them into these graphical tools and request the system to suggest one or more (closest) matching function patterns corresponding to these points (linear, hyperbolic, etc.). Alternatively, the user may enter a formula in these tools and experiment with its behavior.

The application deployment package content developers may be faced with a defined process and framework regarding elastic content authoring. The application deployment package content developers may be able to choose the proper application multi-tier stack and configure the stack according to a predefined application model and an already existing formula repository. In some cases proprietary application configuration may leverage existing formula interfaces and would just provide a different implementation.

Figure 4:
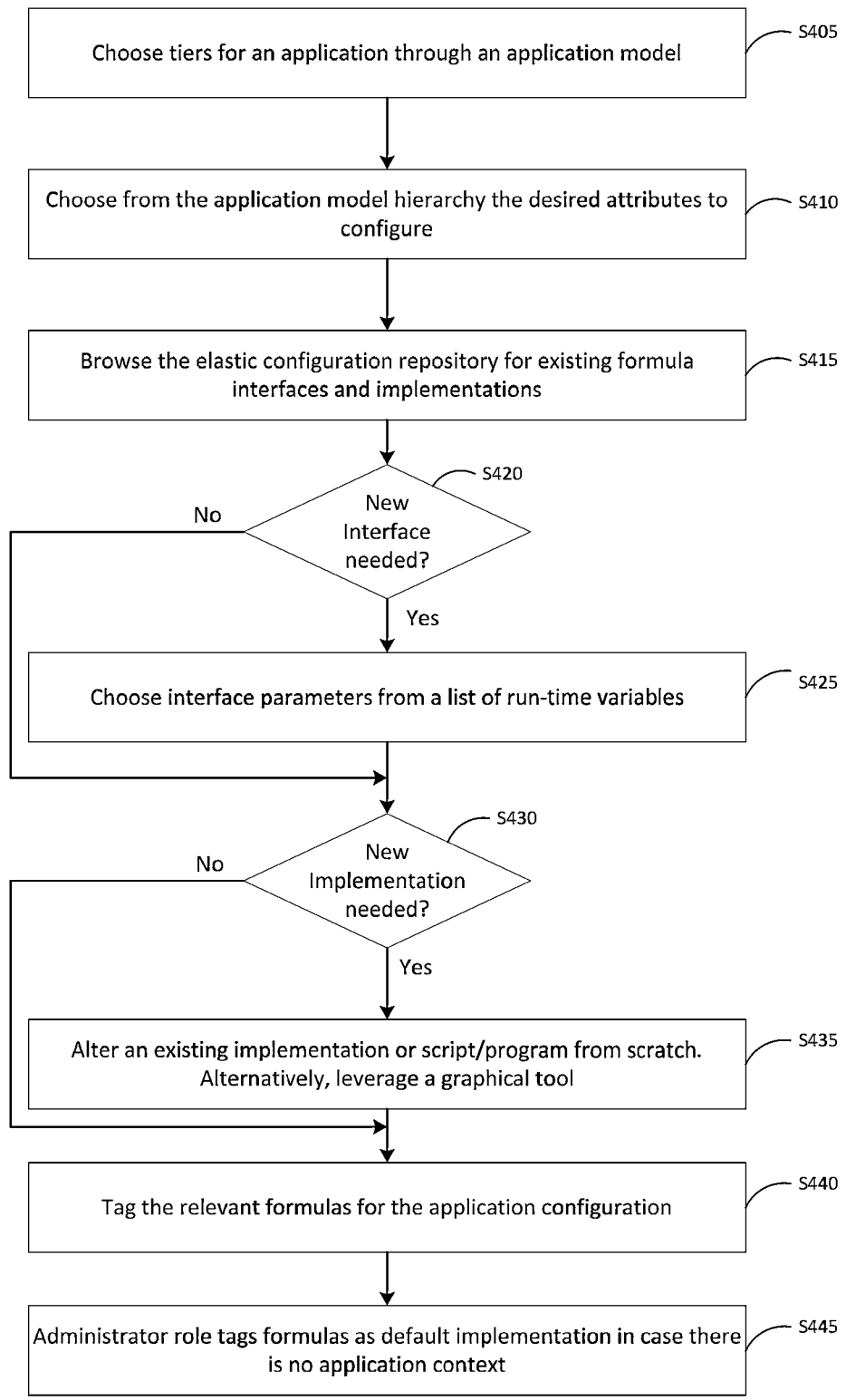
FIG. 4 illustrates an elastic application configuration content authoring method according to an example embodiment.

FIG. 4 illustrates an elastic application configuration content authoring method according to an example embodiment. The elastic application configuration content authoring method may be executed by user operating a client computer including the application attribute configuration user interface described above with regard to FIG. 3.

As shown in FIG. 4, in step S405 a processor associated with, for example, the client computer including the application attribute configuration user interface chooses tiers for an application through an application model. For example, the user of the client computer may be configuring a PetStore application which is leveraging a Tomcat from the web tier branch and a MySQL from the database hierarchy.

In step S410, the processor chooses from the application model hierarchy the desired attributes to configure. For example, the user of the client computer may expand the tree to select a specific resource (e.g., AppServer.Oracle). Upon selection, the attributes associated with the selected resource may be displayed as shown in FIG. 3 described above. The user may select one of the displayed attributes (e.g., "ThreadPoolSize") to be elastically configured.

In step S415, the processor browses the elastic configuration repository for existing formula interfaces and implementations. For example, the user of the client computer may right click on a mouse with its pointer hovering over the sub-window and select a formula from a set of stored formulas (e.g., a previously generated formula or a default formula set by an IT administrator) for the selected attribute for the selected resource.

In step S420, the processor determines if a new interface is needed. If a new interface is needed, processing continues to step S425. Otherwise, processing continues to step S430.

In step S425, the processor chooses interface parameters from a list of run-time variables. For example, the list of run-time variables may include resources described above with regard to FIG. 2 (e.g., the resource pool resources or the servers). The interface parameters may at least one of the list of run-time variables.

In step S430, the processor determines if a new implementation is needed. If a new implementation is needed, processing continues to step S435. Otherwise, processing continues to step S440.

In step S435, the processor alters an existing implementation or script/program from scratch. Alternatively, leverage a graphical tool. For example, as described above with regard to FIG. 3, the user of the client computer may generate the formula using the formula implementation sub-window. For example, the formula implementation sub-window may include a graphical tool to generate a script or program.

In step S440, the processor tags the relevant formulas for the application configuration. For example, the processor may associate the formula with an application to be deployed to the cloud by configuring a deployment of an application package to a cloud network system (e.g., cloud environment 200). The formula may be added to a configuration file (e.g., an XML configuration file) associated with the application deployment package.

In step S445, the processor, using an administrator role, tags formulas as default implementation in case there is no application context. For example, the administrator may choose to set a formula for the default number of the MySQL database "connection pool" or it's default "table size" based on the given disk space (e.g., variable disk space).

Figure 5:
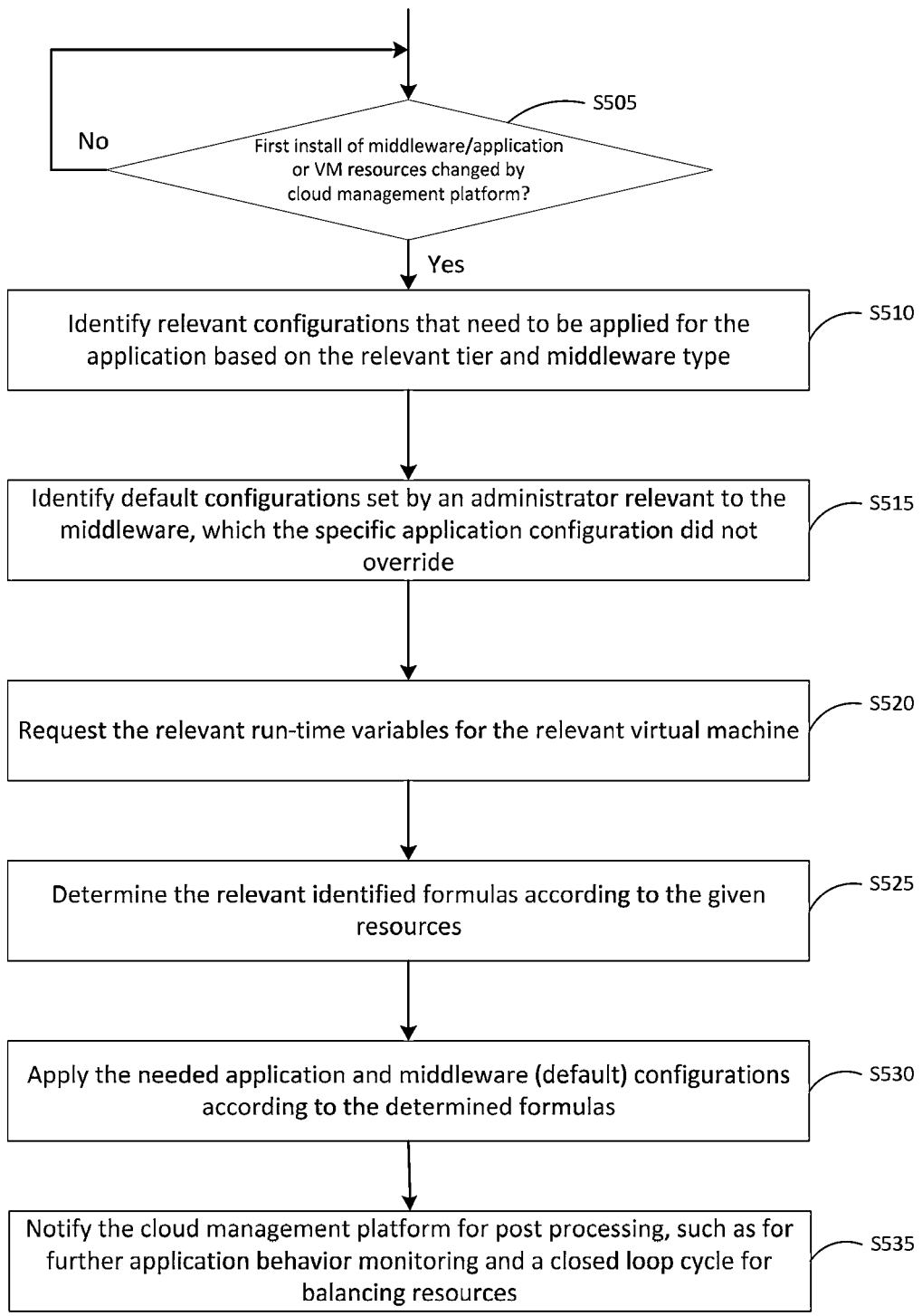
FIG. 5 illustrates an elastic application configuration manager run-time method according to an example embodiment.

FIG. 5 illustrates an elastic application configuration manager run-time method according to an example embodiment. As discussed above with regard to FIG. 2, the elastic application configuration manager 220 is a component which is part of or relates to the cloud management server/service 205. As described above, the cloud management server/service 205 may be responsible for deploying, monitoring and allocating resources amongst its other responsibilities.

According to an example embodiment, the elastic application configuration manager 220 may be responsible for reacting to any deployment of N-tier applications (and middleware) as well as to reallocation of VM resources where applications are deployed. The elastic application configuration manager 220 may make sure that the application configuration reflects best the available resources at any given time.

The elastic application configuration manager 220 may pull from the elastic application configuration repository the relevant application configuration formulas as well as the run-time variables (e.g. through the management server/service 205). The elastic application configuration manager 220 may calculate the formulas and apply the configurations values appropriately.

As shown in FIG. 5, in step S505 the elastic application configuration manager 220 determines if an application is a first install of middleware/application or if VM resources are changed by cloud management platform (e.g., cloud management server/service 205). If the application is a first install of middleware/application or the VM resources are changed by cloud management platform processing continues to step S510. Otherwise, processing returns to step S505. The return to step S505 may include a delay in processing.

In step S510 the elastic application configuration manager 220 identifies relevant configurations that need to be applied for the application based on the relevant tier and middleware type. For example, identifying that the VM which just received more memory has a MySQL database and the PetStore application installed on the VM. the elastic application configuration manager 220 may seek the relevant formulas for the application and middleware that are sensitive to memory change (per their interface).

In step S515 the elastic application configuration manager 220 identifies default configurations set by an administrator relevant to the middleware, which the specific application configuration did not override. For example, if the application does not include a configuration in the elastic configuration formula repository 215, the elastic application configuration manager 220 uses a default configuration for the middleware. The default configuration may also be stored in the elastic configuration formula repository 215.

In step S520 the elastic application configuration manager 220 requests the relevant run-time variables for the relevant virtual machine elastic application configuration manager 220. For example, the elastic application configuration manager 220 may acquire the run-time variables (e.g., amount of memory) from the cloud management platform or mine them from the cloud management server/service 205.

In step S525 the elastic application configuration manager 220 determines the relevant identified formulas according to the given resources. For example, the elastic application configuration manager 220 may query and acquire the formula for the application (or middleware) from the elastic configuration formula repository 215.

In step S530 the elastic application configuration manager 220 applies the needed application and middleware (default) configurations according to the determined formulas. For example, the elastic application configuration manager 220 may run the script or code and/or calculate the formula and apply the result to an associated attribute.

In step S535 the elastic application configuration manager 220 notifies the cloud management platform for post processing, such as for further application behavior monitoring and a closed loop cycle for balancing resources. For example, the cloud management platform could be notified that the PetStore configuration on MySQL was modified (due to increase in disk space). The elastic application configuration manager 220 may then initiate a new monitoring cycle for the application, verifying that its behavior (e.g. performance, availability and capacity) adhere to expected thresholds. This could trigger a new cycle of resource allocation/reallocation.

In addition to playing a role in the context of specific applications configuration, the manager (and the repository) may be used by a cloud automation management framework out of context of any specific application configuration package. Alternatively, the platform setup may lack application context. Or the admin may have defined default formulas which no application has overridden. In these scenarios the elastic configuration manager will apply the default formulas for each attribute (in the relevant middleware model node). This may provide flexibility to stretch and shrink cloud environments elastically, even without the presence of specific application configuration. Yet any application configuration package may simply override the defaults and provide proprietary context.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It will also be well understood by persons of ordinary skill in the art that whilst the example embodiment implements certain functionality by means of software, that functionality could equally be implemented solely in hardware (for example by way of one or more ASICs (application specific integrated circuit)) or indeed by a mix of hardware and software. As such, the scope of the present disclosure should not be interpreted as being limited only to being implemented in software.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

We claim:

1. A client computer comprising:
a processor; and
a memory, the memory including code segments that when executed by a processor cause the processor to:
receive an application stack model including a hierarchy of application model nodes, each application model node associated with one or more configurable attributes of the application on a cloud computer;
select an application model node and an associated configurable attribute from the hierarchy of the application stack model;
interface with an elastic configuration formula repository having elastic configuration formulas therein, each elastic configuration formula identifying a set of variable run-time resources of the cloud computer that are available for the respective configurable attribute of the application on the cloud computer at run-time;
select the elastic configuration formula in the elastic configuration formula repository that identifies the set of the run-time resources of the cloud computer that are available for selected configurable attribute of the application on the cloud computer at run-time; and
interface the application with the selected elastic configuration formula in an application deployment package, wherein the selected elastic configuration formula dynamically sets a value for the selected configurable attribute based on resources of the cloud computer available at any given time when executing the application on the cloud computer.

2. The client computer of claim 1, wherein the code segments when executed by the processor further cause the processor to:
browse the elastic configuration formula repository for at least one existing elastic configuration formula; and
generate at least one new elastic configuration formula for the selected configurable attribute.

3. The client computer of claim 1, wherein the code segments when executed by the processor further cause the processor to interface the application with the selected elastic configuration formula using a graphical tool including one of a curve fitting tool or a regression analysis tool.

4. The client computer of claim 1, wherein the code segments when executed by the processor further cause the processor to provide a user interface for entering a predetermined elastic configuration formula in the elastic configuration formula repository for the selected configurable attribute.

5. The client computer of claim 1, wherein the set of variable run-time resources of the cloud computer includes at least one of allocated memory, disk size, CPU capacity, and network type.

6. The client computer of claim 1, wherein at least one elastic configuration formula is based on observed application behavior in a modeled network including one or more variable run-time resources.

7. The client computer of claim 1, wherein the code segments when executed by the processor further cause the processor to select the associated configurable attribute from the hierarchy of the application stack model by expanding a tree to select a specific resource, the tree being configured to display resources associated with the hierarchy of the application stack model.

8. The client computer of claim 1, wherein the code segments when executed by the processor further cause the processor to:
interface the application with the selected elastic configuration formula by adding the selected elastic configuration formula to a configuration file, and
transmit the configuration file together with the application deployment package to the cloud computer.

9. The client computer of claim 1, wherein the code segments when executed by the processor further cause the processor to:
tag, by a user having administrator privileges, default elastic configuration formulas for use if the application does not have an associated elastic configuration formula.

10. A non-transitory computer readable medium including code segments stored thereon that when executed by a processor cause the processor to:
receive an application stack model including a hierarchy of application model nodes, each application model node associated with one or more configurable attributes of an application when executing in a cloud computer;
select an application model node and an associated configurable attribute from the hierarchy of the application stack model;
interface with an elastic configuration formula repository having elastic configuration formulas therein, each elastic configuration formula identifying a set of variable run-time resources of the cloud computer that are available for the respective configurable attribute of the application on the cloud computer at run-time;
select the elastic configuration formula in the elastic configuration formula repository that identifies the set of the run-time resources of the cloud computer that are available for selected configurable attribute of the application on the cloud computer at run-time; and
interface the application with the selected elastic configuration formula in an application deployment package, wherein the selected elastic configuration formula dynamically sets a value for the selected configurable attribute based on resources of the cloud computer available at any given time when executing the application on the cloud computer.

11. The non-transitory computer readable medium of claim 10, wherein the code segments when executed by the processor further cause the processor to:
browse the elastic configuration formula repository for at least one existing elastic configuration formula; and
generate at least one new elastic configuration formula for the selected configurable attribute.

12. The non-transitory computer readable medium of claim 10, wherein the code segments when executed by the processor further cause the processor to interface the application with the selected elastic configuration formula using a graphical tool including one of a curve fitting tool or a regression analysis tool.

13. The non-transitory computer readable medium of claim 10, wherein the code segments when executed by the processor further cause the processor to select the configurable attribute from the hierarchy of the application stack model by expanding a tree to select a specific resource, the tree being configured to display resources associated with the hierarchy of the application stack model.

14. The non-transitory computer readable medium of claim 10, wherein the code segments when executed by the processor further cause the processor to:
interface the application with the selected elastic configuration formula by adding the selected configuration formula to a configuration file, and
transmit the configuration file together with the application deployment package to the cloud computer.

15. The non-transitory computer readable medium of claim 10, wherein the code segments when executed by the processor further cause the processor to:
tag, by a user having administrator privileges, default elastic configuration formulas for use if the application does not have an associated elastic configuration formula.

16. The non-transitory computer readable medium of claim 10, wherein the code segments when executed by the processor further cause the processor to provide a user interface for entering a predetermined elastic configuration formula in the elastic configuration formula repository for the selected configurable attribute.

17. The non-transitory computer readable medium of claim 10, wherein the set of variable run-time resources of the cloud computer includes at least one of allocated memory, disk size, CPU capacity, and network type.

18. The non-transitory computer readable medium of claim 10, wherein at least one elastic configuration formula is based on observed application behavior in a modeled network including one or more variable run-time resources.

* * * * *